US012747103B2

(12) United States Patent
Moulin et al.

(10) Patent No.: US 12,747,103 B2
(45) Date of Patent: Sep. 29, 2026

(54) AUTOMATED GUIDED VEHICLE AND RACK SYSTEM SUITABLE FOR SUCH VEHICLE

(71) Applicant: Exotec Product France, Croix (FR)

(72) Inventors: Romain Moulin, Lille (FR); Renaud Heitz, Villeneuve d'Ascq (FR)

(73) Assignee: Exotec Product France, Croix (FR)

( * ) Notice: Subject to any disclaimer, the term of this patent is extended or adjusted under 35 U.S.C. 154(b) by 221 days.

(21) Appl. No.: 18/782,250

(22) Filed: Jul. 24, 2024

(65) Prior Publication Data

US 2025/0033880 A1 Jan. 30, 2025

(30) Foreign Application Priority Data

Jul. 26, 2023 (FR) .................................. FR2308082

(51) Int. Cl.
*B65G 1/04* (2006.01)
*B65G 1/02* (2006.01)
*B65G 1/06* (2006.01)
*B65G 47/91* (2006.01)

(52) U.S. Cl.
CPC ........... *B65G 1/0492* (2013.01); *B65G 1/023* (2013.01); *B65G 1/0464* (2013.01); *B65G 1/065* (2013.01); *B65G 47/91* (2013.01); *B65G 2201/0235* (2013.01)

(58) Field of Classification Search
CPC ............................ B65G 1/0464; B65G 1/0492
See application file for complete search history.

(56) References Cited

U.S. PATENT DOCUMENTS

| | | | | |
|---|---|---|---|---|
| 3,608,749 A | 9/1971 | Zollinger | | |
| 4,088,232 A | 5/1978 | Lilly | | |
| 8,628,289 B1 * | 1/2014 | Benedict | B65G 1/0478 414/217 | |
| 11,607,711 B2 * | 3/2023 | Bell | B65G 47/54 | |
| 11,628,849 B2 | 4/2023 | Austrheim | | |

(Continued)

FOREIGN PATENT DOCUMENTS

| | | |
|---|---|---|
| CN | 210122322 U | 3/2020 |
| EP | 3070027 A1 | 9/2016 |

(Continued)

OTHER PUBLICATIONS

Preliminary Search Report and Written Opinion issued on Jan. 29, 2024, in corresponding French Application No. 2308082; 74 pages.

*Primary Examiner* — Jonathan Snelting
(74) *Attorney, Agent, or Firm* — Maier & Maier, PLLC

(57) ABSTRACT

An automated guided vehicle configured to collect receptacles of a rack system for the storage of the receptacles, including: a vehicle body equipped with rolling and driving mechanisms for the vehicle which are configured to ensure movement above the shelving units of the rack system during use, a loading and unloading device connected to the vehicle body and including: a gripping device comprising at least a base support equipped with lateral movement-enabled gripping means configured to grip or release a receptacle and a lifting system comprising means for raising and lowering the gripping device, configured to raise and lower the base support of the gripping device as well as the receptacle held by the gripping device, relative to the vehicle body, along a third direction which is vertical.

15 Claims, 7 Drawing Sheets

(56) References Cited

U.S. PATENT DOCUMENTS

| | | | | |
|---|---|---|---|---|
| 2018/0319590 | A1 | 11/2018 | Lindbo et al. | |
| 2022/0041372 | A1* | 2/2022 | Austrheim | B65G 1/0464 |
| 2022/0212868 | A1* | 7/2022 | Liu | B65G 1/0464 |
| 2022/0412636 | A1 | 12/2022 | Hognaland | |
| 2024/0008425 | A1* | 1/2024 | Kalouche | A01G 31/06 |
| 2024/0182241 | A1* | 6/2024 | Heggebø | B65G 1/0464 |

FOREIGN PATENT DOCUMENTS

| | | | |
|---|---|---|---|
| EP | 3638607 | B1 | 10/2020 |
| KR | 20210011678 | A | 2/2021 |
| NO | 20211378 | A1 | 5/2023 |
| WO | 2022043572 | A1 | 3/2022 |

* cited by examiner

AUTOMATED GUIDED VEHICLE AND RACK SYSTEM SUITABLE FOR SUCH VEHICLE

FIELD

This disclosure relates to an automated guided vehicle configured for collecting receptacles from a rack system for storing said receptacles.

This disclosure also relates to a rack system in and of itself, configured to be served by such a vehicle.

This disclosure also relates to a transport and storage assembly comprising a rack system according to this disclosure and one or more automated guided vehicles according to this disclosure, configured for loading and unloading the cells of the rack system with receptacles.

This disclosure relates more particularly to the field of storage and retrieval systems.

Such storage and retrieval systems include a storage structure that is served by a transport system. According to one popular possibility, the transport system comprises automated guided vehicles configured to pick up and deposit receptacles in the storage structure. These receptacles contain items which are likely to be assembled in order to fulfill orders, said orders ultimately being destined to leave the warehouse for delivery to an end customer or to a distributor. Such storage systems are called ASRS, an acronym for "Automated Storage and Retrieval System".

BACKGROUND

Known in the state of the art, for example from document EP 3070027, is a first type of ASRS comprising remote-controlled vehicles and a storage system including a storage structure defining a plurality of stacking columns. The stacking columns extend substantially vertically, and are placed next to each other in two horizontal directions of the storage volume.

A track is arranged above the storage structure and may comprise a plurality of support rails forming a bidirectional grid for guiding vehicles in a first direction and in a second perpendicular direction, both horizontal.

Each stacking column is arranged to receive a stack of receptacles through an upper mouth of the column. The various upper mouths of the column are respectively directly below the various openings of the grid.

The vehicles each comprise a vehicle body comprising a first rolling assembly and a second rolling assembly, the first assembly and the second assembly configured for selective travel along the rails of the grid, said rails being oriented in the first direction, and along the substantially perpendicular rails of the grid, oriented in the second direction.

The vehicle body moves about substantially above the track and therefore above the storage structure, moving in the first direction or second direction as required.

The vehicle also comprises a lifting system, connected to the vehicle body, for example by means of cables, ensuring the raising or lowering of a receptacle gripping device relative to the vehicle body, along the vertical direction.

During use, and in order to load a stacking column with a receptacle, the vehicle is moved to directly above the stacking column, then the receptacle suspended from the gripping device is lowered through the upper mouth of the stacking column by the action of the lifting system which lowers the receptacle until said receptacle comes to rest on the stack of other receptacles in the column.

Such an ASRS is efficient in its storage density, as the volume of the storage structure comprising stacking columns placed side by side can be entirely dedicated to the storage of receptacles, without wasted volume.

However, such an ASRS based on stacking columns of receptacles has a notable flaw: difficulty in accessing the receptacles arranged in the lower part of the stacking column. For example, if an order requires unloading only the first receptacle located at the bottom in the stacking column, this requires tedious work where the remotely controlled vehicles must successively unstack all of the receptacles located above it, one after the other, in a sequence where the uppermost stored receptacle to the lowermost receptacle are unloaded.

According to the findings of the inventors, such a solution significantly loses efficiency when the nature of the items stored in the same stacking column is heterogeneous, and therefore making such work more likely. One may then consider specific strategies for storing items in the rack, aiming to distribute to the uppermost levels the items which make up most of the orders. This operation, both long and complex, does not even provide a guarantee, as the diversity of orders may be significant, which makes any anticipatory storage strategy ineffective. Furthermore, and according to the findings of the inventors, if such a storage and retrieval system solution in this first family is optimized for densification of the storage system, such densification can complicate maintenance operations if a receptacle ever becomes stuck in a stacking column, particularly since such a storage system offers little room for operator intervention.

Also known in the state of the art, from document EP 3638607 B1, is a second family of ASRS which on the one hand comprises shelving units in the form of a rack comprising superimposed cells for the storage of receptacles, and on the other hand comprises vehicles (or motorized trolleys) configured to serve the superimposed cells.

To this end, the vehicle body comprises rolling and driving means configured to enable the vehicle to move about, typically on the floor of the warehouse, in the two horizontal directions of space.

The vehicles also comprise climbing means, typically motorized and toothed wheels, at the four corners of the vehicle body, configured to couple and mesh with climbing elements (i.e. a rack or a roller chain) extending along the height of the rack uprights in order to allow the vehicle to climb in a vertical direction. Once at the same height as the cell, the vehicle comprises a telescopic fork configured to move a receptacle from a position above the vehicle chassis to a position overhanging the side of the chassis by which the receptacle is inserted into said cell. A slight descent of the vehicle along the upright then ensures the placement of the receptacle in the cell, resting on two mechanical support interfaces of the rack.

According to the findings of the inventors, a limitation of such a storage system in this second family can be a greater complexity in the design of such vehicles comprising such climbing means, in particular as these vehicles need to be able to support their own weight during use as well as that of the load (i.e. the receptacles) when the vehicle is moving vertically along the rack uprights.

Also known from document CN 210 122 322U is another storage system comprising shelving units with container storage spaces, the shelving units being set apart to form aisles. A track comprising a plurality of rails is arranged above the shelving units and aisles to allow a vehicle to travel in a first direction and in a second perpendicular direction, both horizontal. The vehicle comprises in particular a lifting system ensuring the raising or lowering of a container access device in an aisle, the access device being configured for taking a container from a storage space or depositing a container in a storage space.

Finally, document U.S. Pat. No. 4,088,232 describes a storage system comprising a plurality of vertical shafts, each shaft being surrounded by at least three columns comprising a stack of load storage spaces. A plurality of covers arranged above the shafts and columns form a flat surface on which a handling vehicle moves about freely. The handling vehicle comprises a device for removing a cover from a shaft, as well as a lifting device for raising and lowering a fork in this shaft. The fork, once at the same height as a storage space, moves laterally into the storage space in order to pick up or deposit a load.

In general, according to the Applicant's findings, there is a need for an ASRS system that is more efficient during unloading operations in comparison to the first family comprising stacking columns, and is of improved robustness in comparison to an ASRS according to the second family. Another identified need is to store fresh produce or refrigerated products in such ASRS systems, without compromising the operation of the vehicles.

SUMMARY

This disclosure improves the situation.

According to a first aspect, an automated guided vehicle configured for collecting receptacles of a rack system for the storage of said receptacles is proposed, said vehicle comprising:

- a vehicle body equipped with rolling and driving means for the vehicle, configured to ensure movement of the vehicle along a first direction and along a second direction perpendicular to the first direction, above the shelving units of the rack system during use,
- a loading and unloading device connected to the vehicle body and comprising:
  - a gripping device comprising at least one base support equipped with gripping means configured to grip or release a receptacle
  - a lifting system comprising means for raising and lowering the gripping device, configured to raise and lower the base support of the gripping device as well as the receptacle held by the gripping device, relative to said vehicle body, along a third direction which is vertical.

According to the present disclosure, said loading and unloading device comprises said gripping means which is lateral movement-enabled relative to the base support and is configured to transfer the gripped receptacle from the base support to the rack system, or conversely from the rack system to the base support.

The characteristics of the first aspect set forth in the following paragraphs may optionally be implemented, independently of each other or in combination with each other:

The gripping device comprises the base support which is equipped with guide means, in particular guide rollers or guide pads, configured to guide said base support along vertical rails of the storage rack system.

The lateral movement-enabled gripping means is provided with a lateral deployment mechanism which may comprise:

- a telescopic arm connecting the gripping means and said base support, comprising at least a first segment and a second segment that is mounted to slide relative to the first segment in a horizontal sliding direction,
- an actuation means comprising a transmission connecting the first segment and the second segment, configured to deploy the telescopic arm from a retracted position of the first segment and the second segment in which said gripping means is retracted relative to the base support along the sliding direction, and to a deployed position of the first segment and the second segment in which the gripping means and the held receptacle are deployed laterally relative to the base support.

The telescopic arm may be configured to be:

- deployable from the retracted position to the deployed position which is a first deployed position, in a first deployment direction of the second segment relative to the first segment,
- deployable from the retracted position to a second deployed position, in a second deployment direction of the second segment relative to the first segment.

The transmission may comprise a toothed belt and guide pulleys for the belt which comprise at least one motorized pulley.

The rolling and driving means may comprise a first set of rolling means configured to ensure movement of the vehicle along a first direction in the rack system during use, and a second set of rolling means configured to ensure movement of the vehicle along a second direction in the rack system during use.

The vehicle may have means for reversibly and selectively moving the first set of rolling means or the second set of rolling means away from an underlying vehicle support, during a change of direction between the first direction and the second direction.

The sliding direction of the telescopic arm is oriented along the first direction or oriented along the second direction.

The vehicle body may include a cavity arranged centrally within the vehicle body, the cavity having at least one receptacle-receiving opening oriented toward the circulation shafts during use.

According to a second aspect, a rack system for the storage of receptacles is proposed, configured to be served by one or more automated guided vehicles according to this disclosure, comprising:

- shelving units comprising at least one shelving assembly comprising a first shelving unit and a second shelving unit which are arranged relative to each other in a first direction, the first shelving unit and the second shelving unit extending lengthwise in a second direction perpendicular to the first direction, the first and second shelving unit being spaced apart in the first direction, leaving between them a circulation aisle extending lengthwise in the second direction between the two shelving units, and wherein at least the first shelving unit and second shelving unit each comprise one or a plurality of columns of cells, the cells of each column being superimposed vertically, said plurality of columns of cells being offset in the second direction; the cells having lateral access openings enabling the loading of cells with receptacles from the circulation aisle or conversely the unloading of receptacles contained in the cells into said circulation aisle,

- a track arranged on the rack system, above said shelving units, said track configured to cooperate with the rolling and driving means of the automated guided vehicle to enable movement of the vehicle above the shelving units and above said circulation aisle along the first direction and along the second direction with the gripping device in a raised position, said track comprising one or more passages for the gripping device, aligned with one or more circulation shafts of the circulation aisle, the passage(s) configured to allow the selective descent of the gripping device in said circulation shafts, and wherein the cells of the first shelving unit and/or of the second shelving unit have said lateral access openings allowing the cells to be loaded with receptacles from the circulation shafts of said circulation aisle, from a first position of the lateral movement-enabled gripping means in which the receptacle is retracted relative to the base support in said circulation shaft to a second position in which the receptacle is moved into said cell.

The characteristics of the second aspect set forth in the following paragraphs may optionally be implemented, independently of each other or in combination with each other:

The track may comprise first rails, oriented in the first direction, configured for movement of the vehicle in said first direction, and second rails, oriented in the second direction, configured for movement of the vehicle in the second direction.

The rack system may comprise a system of covers which close off the shelving units from above, comprising removable covers, in particular sliding or pivoting covers, configured for removably closing said passage(s).

The shelving units, including the first shelving unit and the second shelving unit, may comprise vertical uprights interconnected by a bracing system, and a plurality of pairs of mechanical interfaces which are fixed to the uprights and distributed along the height of the rack to form said superimposed cells, each pair of mechanical interfaces comprising:

- a first interface fixed to at least two uprights of the vertical structure, cantilevered relative to the two uprights and extending lengthwise in the first direction,
- a second interface fixed to at least two other uprights of the vertical structure, cantilevered relative to the two other uprights and extending lengthwise in the first direction, and wherein support portions of the first interface and of the second interface are oriented towards each other and cantilevered relative to the uprights, in the second direction, said support portions being configured to ensure the support of a receptacle supported by the two support portions of the two interfaces on both sides of the receptacle.

According to a third aspect, a transportation and storage assembly is provided comprising a rack system according to this disclosure and one or more automated guided vehicles according to this disclosure, serving the rack system.

The vehicle(s) are in particular configured for:

- traveling on the track of the rack system in the first direction and second direction, above the shelving units and above said circulation aisle between the first shelving unit and the second shelving unit,
- lowering the base support and said gripping means, with the gripping means in the first position, through one of the passages of the track into one of the vertical circulation shafts which are part of said circulation aisle until level with one of the cells of one of the shelving units, and
- proceeding to load said cell with a receptacle via lateral movement of the gripping means into the second position, by which the receptacle is deployed through the lateral access opening into said cell or proceeding to unload a receptacle stored in said cell by retracting the gripping means into the first position.

The characteristics of the third aspect set forth in the following paragraphs may optionally be implemented, independently of each other or in combination with each other:

The assembly may comprise a robotic arm, in particular multi-axis, arranged at the level of the track, comprising a gripper which typically is pneumatic, said robotic arm being configured to transfer items supplied by the automated guided vehicles, said robotic arm being arranged in a fixed position on said track, or provided as movable on the track in at least a horizontal direction, or even in the first direction and second direction, for example, the robotic arm being carried on board an automated guided vehicle configured to move in the first direction and second direction.

The assembly may comprise receptacles configured to be loaded and unloaded into and out of the cells of the rack system by the lateral movement-enabled gripping means of the vehicles, and some or all of the cells of the first shelving unit or second shelving unit may be multiple cells of multiple depths, each multiple cell being configured to receive at least two receptacles arranged one behind the other in the first direction, and the lateral movement-enabled gripping means is configured to load and unload said at least two receptacles in said multiple cell.

With the shelving units of the rack system resting on the floor, said assembly may comprise at least one receptacle elevator configured to raise the receptacles from the floor to the track for pickup by the automated guided vehicles, or configured to lower the receptacles unloaded by the vehicles, from the track to the floor.

BRIEF DESCRIPTION OF DRAWINGS

Other features, details and advantages will become apparent upon reading the detailed description below, and upon analyzing the appended drawings, in which.

DETAILED DESCRIPTION

Figure 1:
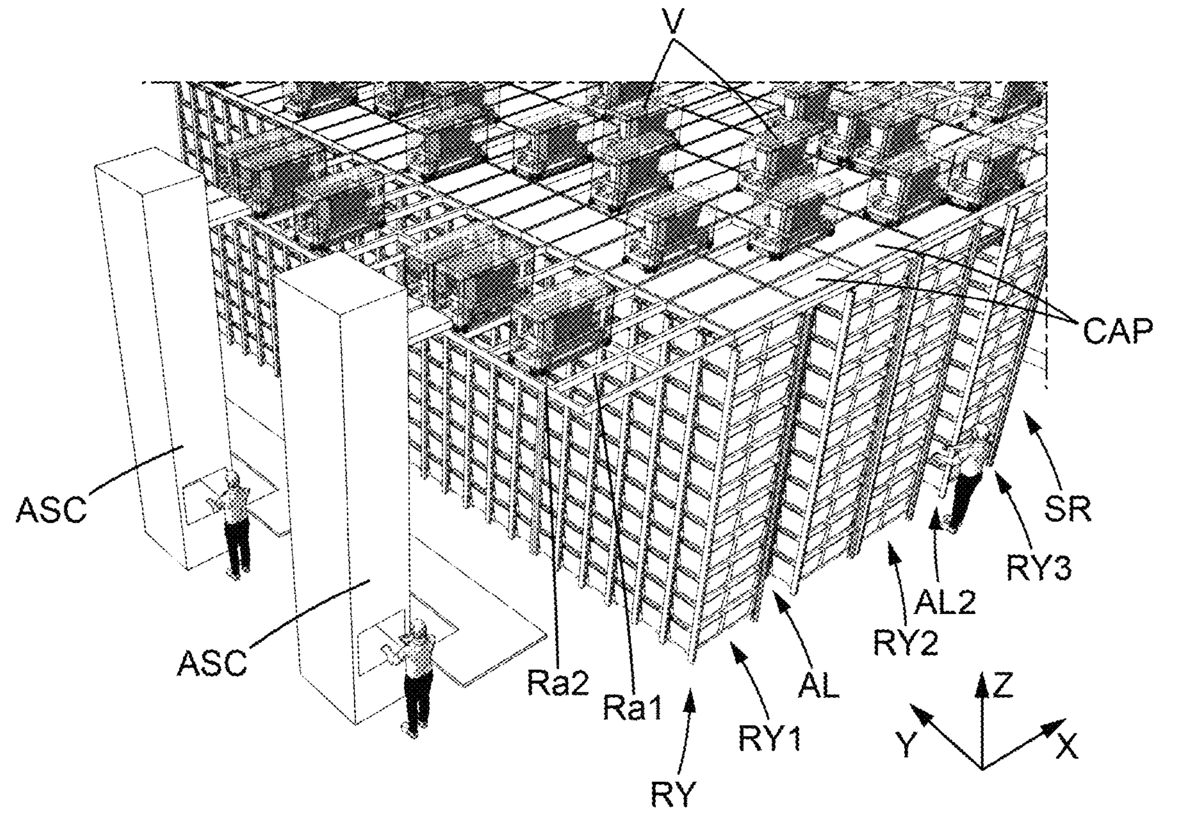
FIG. 1 shows an assembly according to this disclosure which comprises automated guided vehicles and a rack system comprising a first shelving unit and a second shelving unit which are separated by a circulation aisle, the rack system comprising a track arranged above the shelving units, the track being configured for the circulation of vehicle bodies above the shelving units and above said circulation aisle in a first direction X and in a second direction Y.
Figure 2:
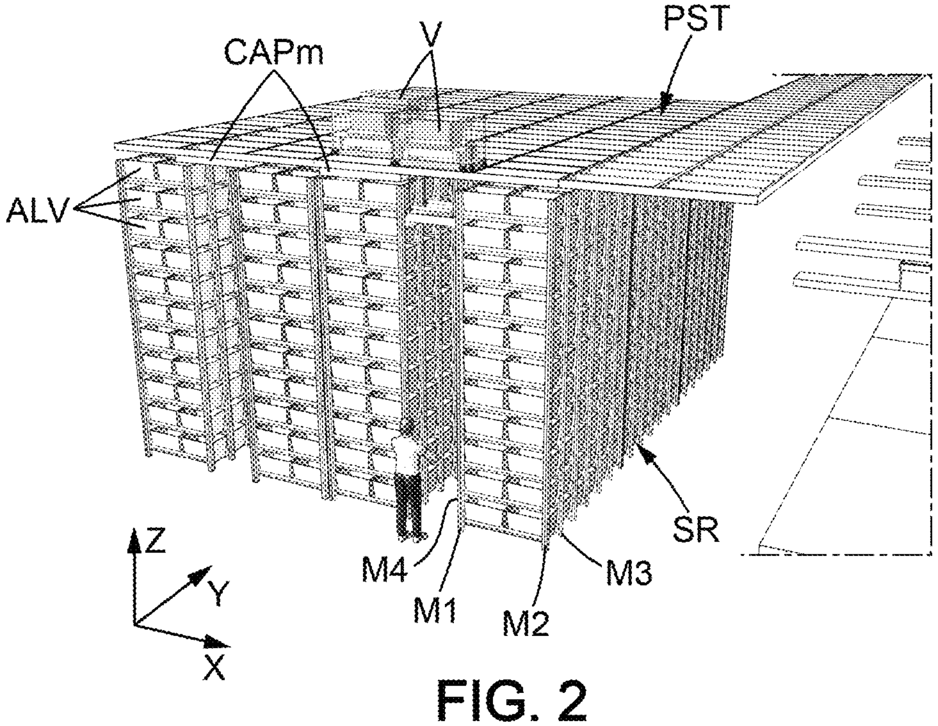
FIG. 2 is a view of FIG. 1, illustrating an automated guided vehicle where the vehicle body is arranged on the track, directly above a circulation aisle between two shelving units, a receptacle gripping device of the vehicle comprising a base support being lowered relative to the vehicle body, by a lifting system, into a circulation shaft which is part of said aisle.
Figure 3:
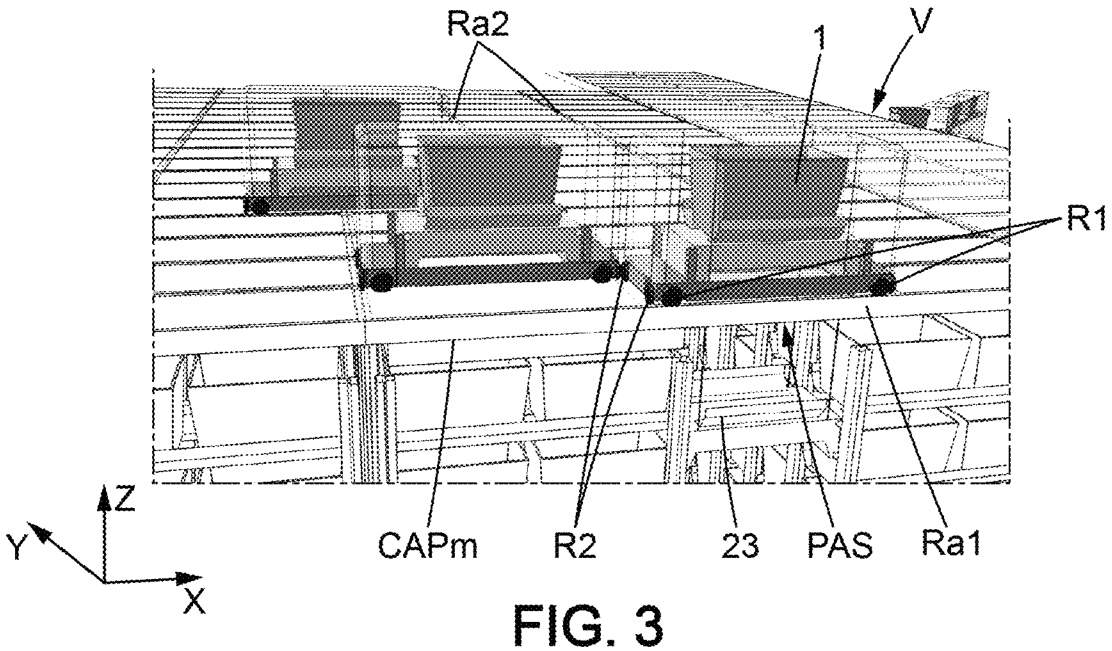
FIG. 3 is a detailed view of FIG. 2, illustrating the gripping device comprising the base support, in the circulation shaft, at the height of an upper level cell, said cell being a multiple (double) cell configured to receive two receptacles, one behind the other in the first direction.
Figure 4:
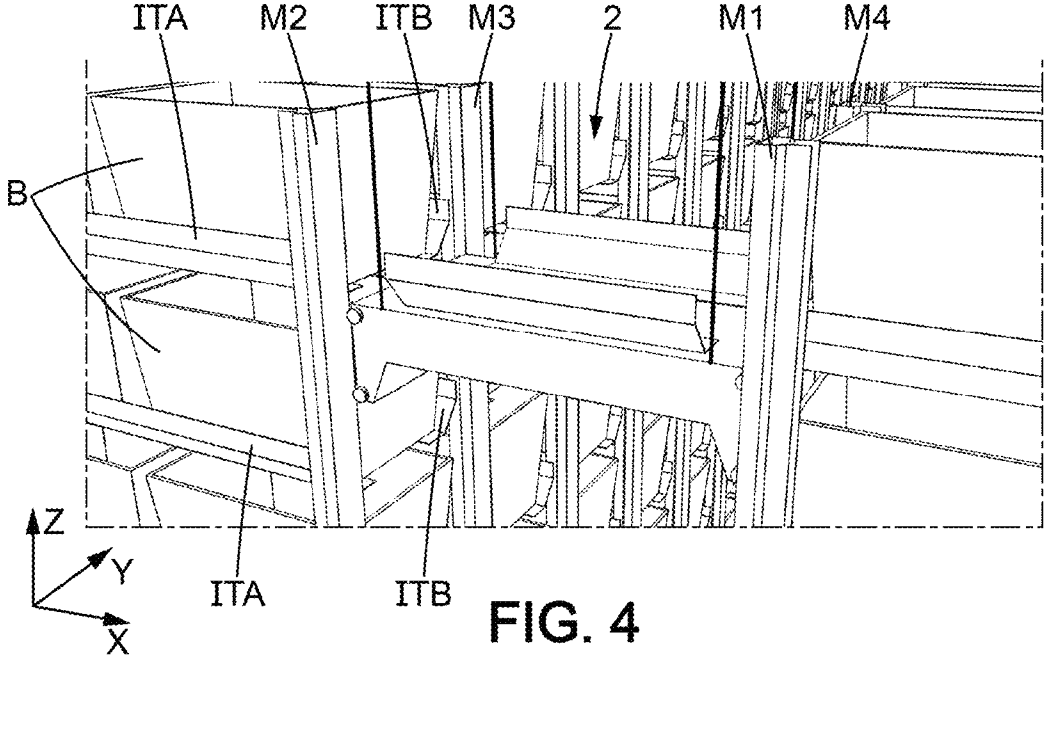
FIG. 4 is a detailed view of FIG. 3, illustrating a pair of mechanical interfaces configured to support a receptacle in said cell, the pair comprising a first mechanical interface connecting two uprights of the shelving unit in the first direction X, and a second mechanical interface connecting two other uprights in the first direction X, support portions of the first interface and second interface being oriented towards each other and cantilevered relative to the uprights in the second direction Y, the two portions configured to ensure the support of a receptacle supported by the two support portions of the two interfaces on both sides of the receptacle.
Figure 5:
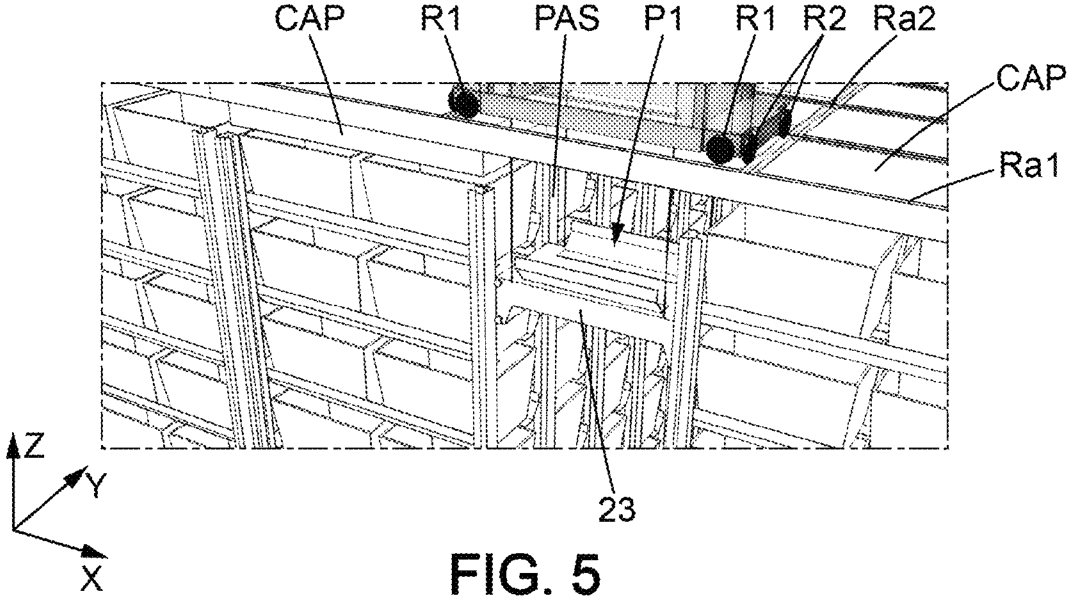
FIG. 5 is a detailed view illustrating, on the vehicle body, the first set of rolling means configured to engage with the first rails of the track to ensure movement of the vehicle body in the first direction X, and the second set of rolling means configured to engage with the second rails of the track to ensure movement of the vehicle body in the second direction Y, said track comprising a set of covers forming a covering above the shelving units, one of the covers above said aisle being retracted in translation into a position which leaves open access to a passage allowing the gripping device to descend through said passage, from the track, into the shaft of the circulation aisle, in particular the gripping means being in a first position ensuring that a receptacle is held retracted on the base support.
Figure 5A:
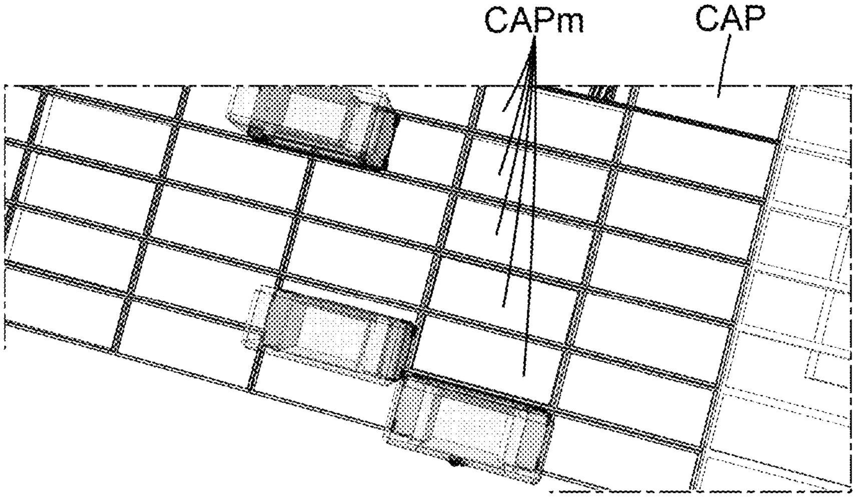
FIG. 5A is a top view illustrating the covering formed by the covers.

In FIG. 1, the object of the present disclosure is a transportation and storage assembly comprising a rack system and one or more automated guided vehicles V configured to serve the rack system. The present disclosure relates to such an automated guided vehicle in and of itself, as well as to such a rack system in and of itself.

The rack system for storing receptacles is configured to be served by one or more automated guided vehicles. The rack system has shelving units RY comprising at least one shelving assembly comprising a first shelving unit RY1 and a second shelving unit RY2.

First shelving unit RY1 and second shelving unit RY2 are arranged to be offset relative to each other in a first direction X, first shelving unit RY1 and second shelving unit RY2 extending lengthwise in a second direction Y that is perpendicular to first direction X.

First RY1 and second RY2 shelving units are spaced apart along the first direction X, leaving unobstructed between them a circulation aisle AL extending lengthwise in the second direction Y between the two shelving units RY1, RY2.

First shelving unit RY1 and second shelving unit RY2 each comprise one or preferably a plurality of columns of cells. The cells of each column are superimposed in the vertical direction Z. The various columns of cells are offset along the second direction Y. The cells have lateral access openings EA allowing cells to be loaded with receptacles B from circulation aisle AL, or conversely allowing receptacles B contained in the cells to be unloaded into said circulation aisle.

The lateral access openings of the various cells are independent, so as to allow the loading and/or unloading of cells independently of each other, or even the concurrent loading and/or unloading of different cells from multiple automated guided vehicles.

In general, cells ALV may be simple cells, in the sense that they are of a depth configured to receive a single receptacle in each one.

Advantageously, the cells may also be multiple cells, namely of multiple depth, each multiple cell configured to receive at least two receptacles B arranged one behind the other in the first direction X, and typically two receptacles or even more such as three receptacles along the first direction X, one behind the other in the first direction X.

Multiple cells allow increasing density in the storage capacity of the system, i.e. increasing the number of receptacles stored per unit volume in the rack system, in comparison to the same storage system comprising single cells which requires a greater lost volume (of storage) for the additional circulation aisles.

It is further understood that the rack system is not limited to two shelving units consisting of first shelving unit RY1 and second shelving unit RY2, meaning the rack system may comprise other shelving unit(s), and for example a third shelving unit RY3 extending in the second direction Y, parallel to the second and first shelving unit RY1, RY2, the third shelving unit being offset in the first direction relative to the second shelving unit RY2 by a (second) circulation aisle extending parallel to said circulation aisle.

The third shelving unit may itself comprise one or more columns of cells, typically as many as the other shelving units (i.e. first shelving unit RY1 or second shelving unit RY2). The number of columns of cells in shelving unit RY1 (or RY2) is typically greater than 1 and for example may be, depending on storage needs, between 1 and 10 or even more. The number of shelving units may be greater than 3.

The structure of shelving units RY1, RY2, RY3 may typically comprise a set of vertical uprights M1, M2, M3, M4, the uprights being distributed in the second direction Y in a spacing which is typically constant, corresponding to the width of cells ALV, and in the first direction according to the length of cells ALV. The different uprights are held together by a bracing system ensuring that the vertical structure of the uprights is maintained.

The structure of the shelving units further includes a plurality of pairs of mechanical interfaces which are fixed to uprights M1, M2, M3, M4 and distributed along the height of the shelving units to form said superimposed cells.

Each pair of mechanical interfaces comprises:

- a first interface ITA fixed to at least two uprights M1, M2 of the vertical structure, cantilevered relative to the two uprights and extending lengthwise in the first direction X
- a second interface ITB fixed to at least two other uprights M3, M4 of the vertical structure, cantilevered relative to the two other uprights and extending lengthwise in the first direction.

Support portions of first interface ITA and of second interface ITB are oriented towards each other and cantilevered relative to uprights M1, M2, M3, M4 in the second direction Y, the support portions configured to ensure the support of a receptacle supported by the two support portions of the two interfaces on both sides of the receptacle.

The rack system also comprises a track PST, which is arranged above shelving units RY of the rack system, above said shelving units RY and configured to cooperate with rolling and driving means of automated guided vehicle V to allow movement of the vehicle above the shelving units and above said circulation aisle along the first direction X and the second direction Y. According to one embodiment, track PST may comprise first rails Ra1, oriented in the first direction X and configured for movement of the vehicle in said first direction X, and second raids Ra2, oriented in the second direction Y and configured for movement of the vehicle in the second direction Y. First rails Ra1 and second rails Ra2 form a bidirectional grid.

Automated guided vehicle V according to this disclosure is configured to collect receptacles B from rack system SR, said vehicle comprising a vehicle body 1 equipped with rolling and driving means for the vehicle which are configured to move the vehicle along the first direction X and along the second direction Y perpendicular to the first direction X, atop a rack system during use. The rolling and driving means are configured to cooperate with the track.

The rolling and driving means may comprise a first set of rolling means R1 configured to move the vehicle along a first direction in the rack system during use, and a second set of rolling means R2 configured to move the vehicle along a second direction Y in the rack system during use.

First set of rolling means R1 may be configured to cooperate with first rails Ra1 while being guided by first rails Ra1 to ensure movement of the vehicle in the first direction X, while second rolling assembly R2 may be configured to cooperate with second rails Ra2 while being guided by second rails Ra2 to ensure movement of the vehicle in the second direction Y of the track.

According to such an embodiment, the vehicle may comprise means for reversibly and selectively moving first set of rolling means R1 or second set of rolling means R2 away from an underlying vehicle support, during a change of direction between the first direction X and the second direction Y.

Thus, said means for reversibly and selectively moving ensure the engagement of first set of rolling means R1 to ensure movement of the vehicle body along first rails Ra1, while second set of rolling means R2 is not engaged with second rails Ra2.

When changing direction, second set of rolling means R2 is lowered to engage with second rails Ra2, then first set of rolling means R1 is raised to disengage from first rails R1. The vehicle body is then movable in the direction of first rails Ra1. The reverse change in direction is achieved by lowering first set of rolling means R1 to engage with first rails Ra1, then raising second set of rolling means R2 to disengage them from second rails Ra2.

According to another embodiment (not illustrated), the track may have no rails. The rolling and driving means may comprise, as taught in patent FR3125515 from the present applicant, at least three drive wheels (for example three wheels or four wheels) intended to roll on the ground and able to pivot at least 90°.

Said drive wheels are mounted on pivoting and driving devices fixed to the vehicle body, each of said pivoting and driving devices comprising a motor for actuating a means for pivoting a drive wheel around a vertical axis, intended to enable pivoting a drive wheel. The pivoting devices, configured to pivot the wheels 90°, allow changes in vehicle direction by aligning the direction of rotation of the wheels with the X direction or Y direction, between two pivots, to enable movement of the vehicle on the track in the first direction X and in the second direction Y.

The automated guided vehicle also comprises a loading and unloading device connected to the vehicle body and comprising:

- a gripping device 2 comprising at least one base support 23 equipped with a gripping means MP configured to grip or release a receptacle,
- a lifting system comprising a means for raising and lowering the gripping device, configured to raise and lower base support 23 of the gripping device as well as the receptacle held by the gripping device, relative to said vehicle body, along a third direction Z which is vertical.

Gripping means MP configured to release or grip a receptacle may comprise a support surface (for example a planar support) configured to provide support for the receptacle from below, and as illustrated in the figures. Where appropriate, one or more positioning fingers projecting from the support surface may be configured to enter one or more corresponding cavities in a bottom wall of the receptacle. The engagement between fingers and cavities ensures a controlled positioning between the receptacle and the gripping means and as is known per se from patent EP 3638607 B1 by the present Applicant.

The gripping means is not limited to such an engagement from below the receptacle in particular, and may comprise any other means, such as hooks, or suction cup (pneumatic), capable of gripping the receptacle from above.

The lifting system comprising the means for raising and lowering the gripping device may typically comprise at least one flexible connection LS, typically several flexible connections LS extending in parallel, such as cables connecting the vehicle body to base support 23 of the gripping device.

The lifting system may in particular comprise four flexible connections, connected to the four corners of base support 23. The lifting system may comprise a motorized winch mechanism, comprising one or more motorized reels mounted on the vehicle body, on which the flexible connections can roll or unroll to cause the descent or rise of base support 23.

The lifting system is configured to lift base support 23 to a raised position of gripping device 2 where gripping device 2 and a receptacle held by the gripping device are positioned above the track on which the rolling and driving means of the vehicle body are configured to move.

In this raised position, the gripping device and the receptacle carried by the gripping device do not hinder the movement of the vehicle on the track: said body of the automated guided vehicle can move about on track PST, in particular along the first direction X and/or along the second direction Y, thereby moving the held receptacle.

According to one embodiment, the vehicle body may comprise a cavity arranged centrally inside the vehicle body, the cavity having at least one receptacle-receiving opening oriented towards the circulation shafts during use.

In said raised position, receptacle B carried by the gripping means is housed wholly or in part in cavity CAV. This cavity may allow the load (the receptacle) to be centered relative to the rolling members of the rolling and driving means, in particular to promote stability during acceleration phases (positive or negative). According to another embodiment, in the raised position, the base support and the receptacle carried by the gripping means may laterally cantilevered relative to the portion of the vehicle body comprising the rolling and driving means.

The track also comprises one or more passages PAS for gripping device 2, in line with or more circulation shafts which are part of said circulation aisle. The various passages PAS are configured to allow gripping device 2 (and the receptacle carried by the gripping device) to descend selectively into said circulation shafts which are part of said circulation aisle. Said circulation shafts are side by side in the second direction Y, extending next to the various columns of cells of the shelving units, respectively in said second direction Y. Generally, each circulation shaft may be delimited by four uprights which are part of the two shelving units one on either side of said circulation aisle, and for example two uprights which are part of first shelving unit RY1 and two other uprights which are part of second shelving unit RY2, these being diametrically opposite relative to said circulation aisle.

When said track comprises first rails Ra1 extending in the first direction X and second rails Ra2 extending in the second direction Y, forming a grid of rails, passages PAS may be formed by the openings between rails Ra1 Ra2, extending above said circulation aisle AL and respectively above the various circulation shafts.

Cells ALV of first shelving unit RY1 and/or of second shelving unit RY2 have lateral access openings EA so as to allow loading cells ALV with receptacles B from the circulation shafts which are part of said circulation aisle AL.

For this purpose, said loading and unloading device comprises a lateral movement (or lateral deployment) mechanism configured to move the gripping means, and the receptacle gripped by the gripping means, laterally relative to base support 23.

According to this disclosure, gripping means MP therefore moves laterally relative to base support 23, configured to transfer the gripped receptacle B from base support 23 to the rack system in a first direction, or conversely from the rack system to base support 23 in a second direction.

In particular, lateral-movement enabled gripping means MP may be configured to move from a first position P1 in which the receptacle gripped by the gripping means is retracted relative to base support 23, to a second position P2 of the gripping means in which the receptacle gripped by the gripping means is deployed laterally relative to base support 23 in at least a horizontal movement.

In first position P1, the receptacle and base support 23 are at least partially overlapping, in particular along the first direction X and in particular along the Y direction, or are even completely overlapping.

In second position P2, the receptacle is deployed so as to be laterally cantilevered relative to base support 23, entirely or even at least mostly, in particular in the first direction X.

Lateral movement-enabled gripping means MP advantageously allows the loading of cells ALV with receptacles B from the circulation shafts which are part of circulation aisle AL, from first position P1 of the gripping means in which the receptacle is retracted relative to base support 23, the receptacle being arranged in said circulation shaft, to said second position P2 in which the receptacle is moved into said cell ALV.

The lateral movement of gripping means MP relative to base support 23 may be carried out in the first direction X.

Such a transport and storage assembly thus comprises a rack system according to this disclosure and one or more automated guided vehicles V according to this disclosure.

In particular, the vehicle(s) are configured for:

- circulating on track PST of the rack system in the first direction X and the second direction Y, above the shelving units RY, including first shelving unit RY1 and the second shelving unit on the one hand, and said circulation aisle AL between first shelving unit RY1 and the second shelving unit RY2 on the other hand,
- lowering base support 23 and said gripping means, in particular with gripping means MP in first position P1, through one of the passages of track PST into one of the vertical circulation shafts that is part of circulation aisle AL until level with one of the cells of one of shelving units RY, and
- proceeding to load said cell ALV with a receptacle B by lateral movement of gripping means MP into second position P2 of gripping means MP in which the receptacle is deployed through lateral access opening EA into cell ALV, or proceeding to unload a receptacle stored in said cell, by retracting the gripping means to first position P1.

Such an assembly according to this disclosure is advantageous compared to the first family of storage and withdrawal systems as taught by EP 3070027 and based on a storage system with stacking columns, in that the different cells of a same column are accessible independently of each other, from said circulation aisle AL, by lateral movement-enabled gripping means MP, by means of the lateral access openings EA: it is possible to load or unload any of the cells in the column of cells, independently of the other cells in the same column.

Another advantage is the presence of circulation aisle AL between shelving units RY1/RY2, or even between shelving units RY2/RAY3. This facilitates maintenance operations by allowing an operator to move about between said shelving units.

Said assembly may in particular be equipped with a maintenance device (such as a lifting platform) configured to circulate along said circulation aisle, said device provided with:

a base support, providing means for rolling on the ground, a lifting platform configured for working at height, and a lifting mechanism, for example of the telescopic or scissor type, connecting the lifting platform to the base support, configured for deploying the platform heightwise, or for retracting it to a position occupying less vertical space. Said maintenance device may in particular be as described in patent FR2303593 of the present Applicant, providing improved stability by guiding on the uprights of said maintenance aisle.

Such an assembly according to this disclosure is further advantageous compared to the second family of storage and withdrawal systems, as taught by EP 3638607 B1, in that the bodies of the vehicles remain at constant height above track PST during the operations of loading/unloading cells ALV, and therefore do not require the vehicle to lift its own weight in order to load/unload the cells.

The rack system may comprise a system of covers CAP closing off the shelving units from above, at the track level. The system of covers forms a covering which separates the atmosphere above the track from the internal atmosphere below track PST comprising the shelving units. The internal atmosphere may be controlled, in particular refrigerated for the preservation of fresh produce or even for the preservation of frozen food products.

The system of covers CAP comprises removable covers CAPm, in particular sliding or pivoting covers, configured for removably closing off passage(s) PAS.

According to one embodiment, gripping device 2 comprises base support 23 which is equipped with guide means GD, in particular guide rollers or guide pads, configured to guide base support 2 along vertical rails RV of the storage rack system. Guidance of basic support 2 may take place at least along at least two uprights of the shelving units, one on either side of circulation aisle AM, and in particular two of the uprights delimiting the circulation shaft.

Guidance may be carried out on only two uprights of the circulation shaft, and typically on two uprights arranged on a diagonal of the circulation shaft.

Figure 6:
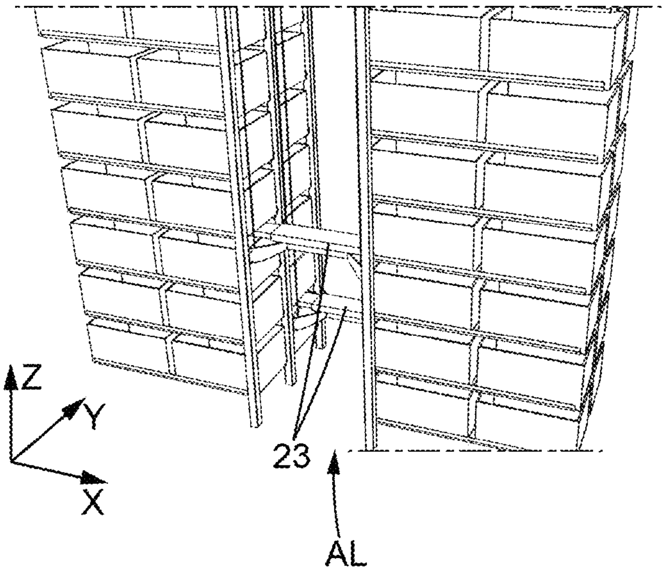
FIG. 6 is a detailed view of the circulation aisle between the two shelving units, illustrating two gripping devices which are part of two separate automated guided vehicles, the two gripping devices respectively lowered to different heights in two circulation shafts, the two shafts being adjacent along the second direction Y of said circulation aisle, the two adjacent circulation shafts being respectively arranged, along the first direction, next to two columns of cells which are adjacent along the second direction Y of the shelving units.
Figure 6A:
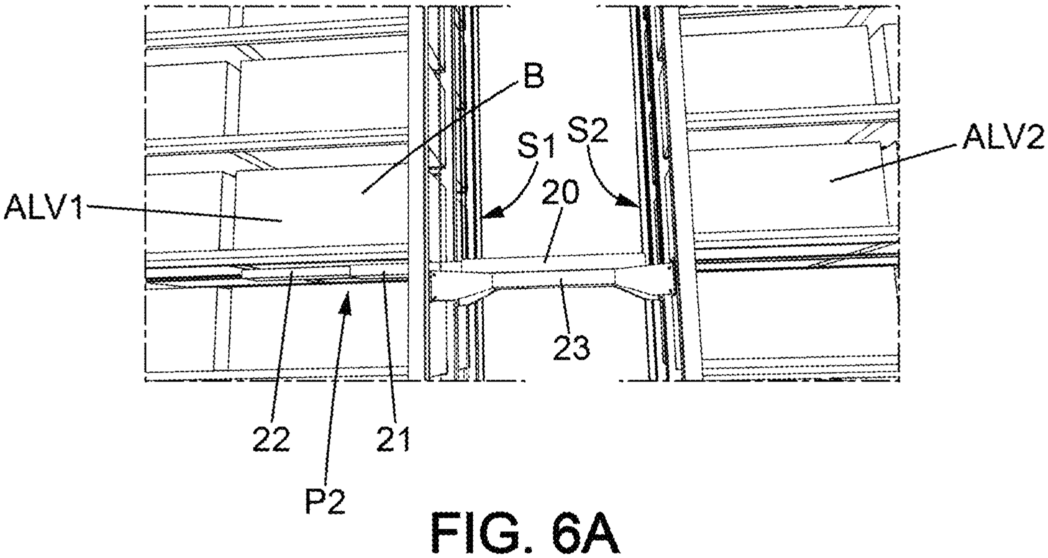
FIG. 6A is a detailed view of FIG. 6, illustrating a lateral movement-enabled gripping means which moves from a first position to a second position, laterally offset, in which the gripping means is deployed laterally relative to a base support in a horizontal movement, by means of a lateral deployment mechanism comprising a telescopic arm connecting the gripping means and said base support, the telescopic arm comprising a first segment, a second segment mounted to slide relative to the first segment, and a third segment mounted to slide relative to the second segment, the gripping means possibly comprising a finger projecting from the second segment and configured to engage with an indent under the bottom of the receptacle.
Figure 6B:
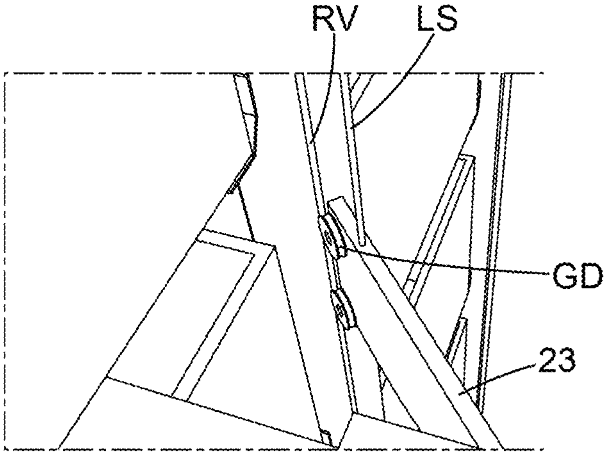
FIG. 6B is a detailed view of FIG. 6A.
Figure 7:
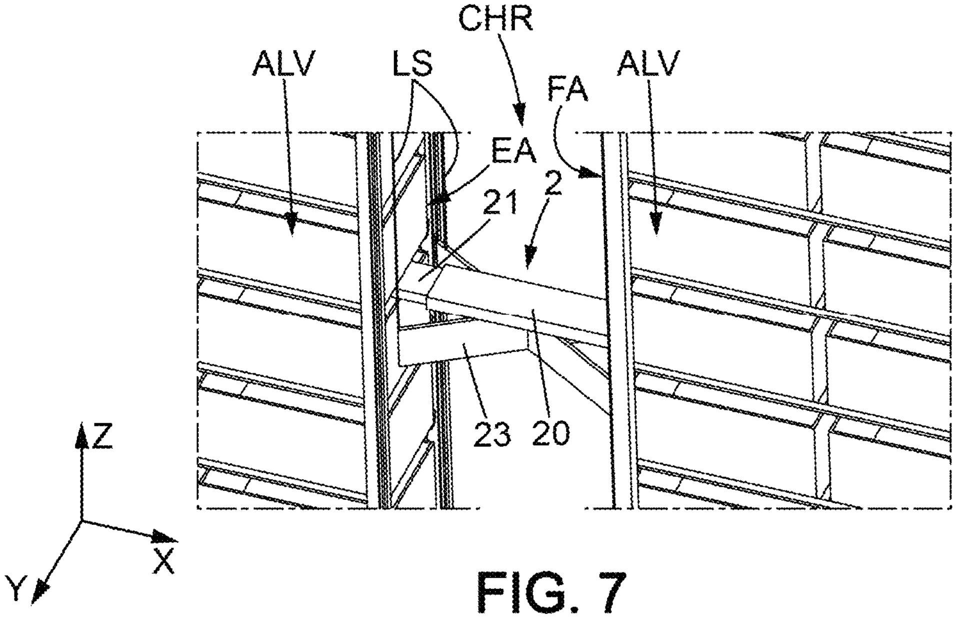
FIG. 7 is a detailed perspective view of FIG. 6 of the gripping device comprising the base support, which is suspended by flexible connections such as cables of the lifting system.
Figure 7A:
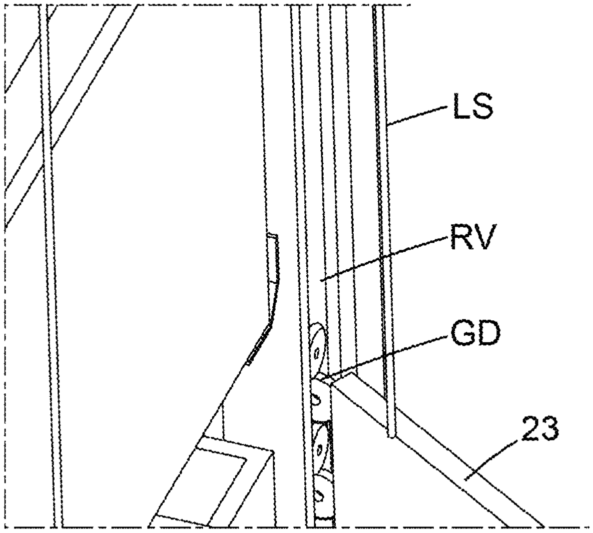
FIG. 7A is a view of the guide means, comprising rollers of the base support which are configured to guide the base support on a vertical rail extending along an upright of the shelving.
Figure 7B:
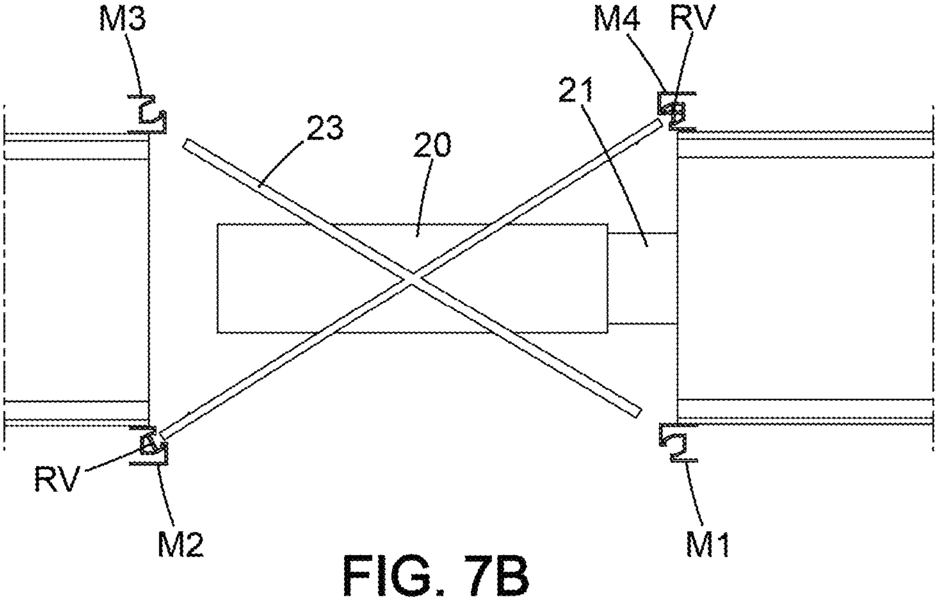
FIG. 7B is a view of one possibility for guiding the base support, comprising rollers configured to be guided vertically along two vertical rails distributed one on either side of said circulation aisle.

According to one embodiment, the lateral movement (or lateral deployment) mechanism may comprise:

a telescopic arm connecting the gripping means and said base support, comprising at least a first segment 20 and a second segment 21 mounted to slide relative to the first segment in a horizontal sliding direction, an actuation means comprising a transmission connecting the first segment and the second segment, configured to deploy the telescopic arm from a retracted position of first segment 20 and second segment 21 in which said gripping means and base support 23 are retracted in the sliding direction into first position P1 of the gripping means, and to a deployed position of first segment 20 and second segment 21 in which the gripping means and the gripped receptacle are deployed laterally relative to base support 23, into second position P2 of the gripping means, as illustrated in FIG. 6A in particular.

The transmission may comprise a toothed belt and guide pulleys for the belt which comprise at least one motorized pulley. The transmission may further comprise a toothed rack, as described as prior art in patent FR2304077, or may be devoid of such a rack as disclosed by FR2304077.

The telescopic arm may comprise a third segment 22, configured to be deployed and retracted relative to second segment 21, and in a synchronized manner relative to the retraction/deployment of second segment 21 relative to first segment 20, and, as taught by FR2304077, by means of a transmission comprising pulleys and belts.

In the case of a multiple cell, the lateral movement-enabled gripping means is configured to load and unload said at least two receptacles in said multiple cell. The number of telescopic segments may be increased (to four or more segments) according to needs, to increase the working stroke of the lateral deployment-enabled gripping means.

Generally speaking, the lateral movement-enabled gripping means may be configured to carry out loading or unloading operations on only one side of base support 23, in order to work on only one side of circulation aisle AL, or to carry out loading or unloading operations on two sides of base support 23 in order to work on both sides of circulation aisle AL.

Thus, and according to one embodiment, the telescopic arm may be configured to be:

deployable from the retracted position to the deployed position which is a first deployed position, in a first direction S1 of deployment of second segment 21 relative to first segment 21, deployable from the retracted position to a second deployed position, in a second direction S2 of deployment of the second segment relative to the first segment.

The first deployed position of the telescopic arm and the second deployed position of the telescopic arm provide two so-called "second" positions of the gripping means, in which receptacle B can be deployed laterally, respectively on both sides of base support 23. In general, the lateral movement mechanism ensuring the lateral movement of the gripping means is not limited, however, to systems with telescopic arms ensuring lateral deployment of the gripping means in second position P2, which typically is outside the boundaries of base support 23, along the first direction X.

Figure 8A:
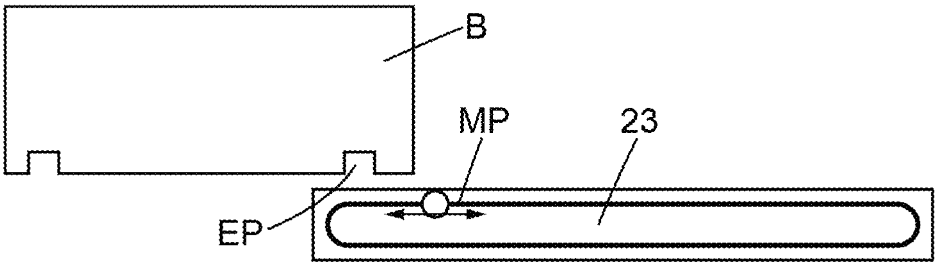
FIG. 8A is a schematic side view illustrating one possible embodiment of the gripping means, which takes the form of a hooking member such as a hooking bar configured to hook a complementary portion, in particular a concave portion of the receptacle, and a lateral movement mechanism for the hooking bar with limited travel in the first direction X, within the boundaries of the base support, the mechanism having a motorized transmission, such as at least one closed belt (or chain), and typically two synchronized belts (or chains), ensuring movement of the gripping means from the first position in which the receptacle is retracted onto the base support to the second position configured to ensure lateral deployment of the receptacle relative to the base support.
Figure 8B:
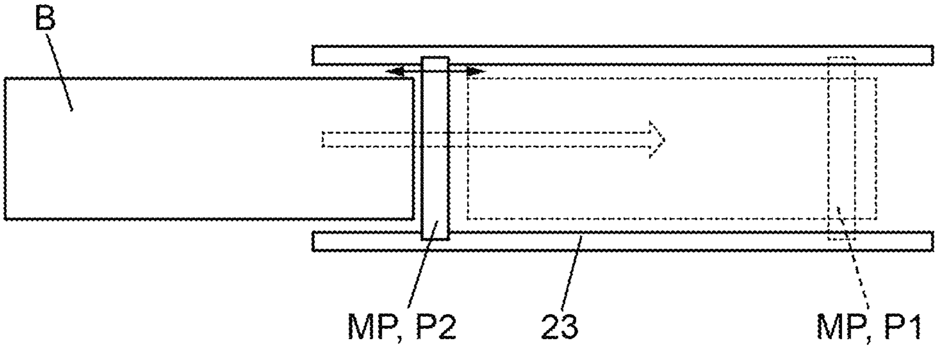
FIG. 8B is a top view of the lateral movement mechanism, illustrating in solid lines the position of the gripping means in the form of a hooking bar by way of non-limiting example, in the first position configured to hold the receptacle in the retracted position on the base support, and illustrating in dotted lines the second position configured to ensure lateral deployment of the receptacle so that it is overhanging relative to the base support.

According to one embodiment, illustrated for informational purposes in FIGS. 8*a* and 8*b*, gripping means MP may remain within the boundaries of base support 23, in particular in second position P2 and in first position P1, or even in intermediate positions of the gripping means between these two positions P1, P2.

Base support 23 may thus comprise a chassis, in particular on which receptacle B may slide in the first direction X, in particular on two lateral guides. The motorized lateral movement mechanism is configured to ensure the movement of gripping means MP in the first direction X, within the boundaries of base support 23. The motorized mechanism may comprise at least one closed belt (or at least one chain) guided by two pulleys (or guided by two toothed wheels) and typically two closed belts (or two chains), in parallel and synchronized. The gripping means is integral with the belt or chain, configured to be moved in the first direction X.

In FIGS. 8*a* and 8*b*, gripping means MP may take the form of a transverse bar, secured by its two ends respectively to the two belts (or to the two chains). This bar is configured to hook the receptacle by being housed in an indent EP, such as a groove having its opening under receptacle B, typically extending in the second direction Y. Receptacle B may comprise two separate grooves which are offset in the first direction and inside of which the hooking bar may selectively be inserted, depending on the direction of deployment of the receptacle relative to the circulation aisle.

The rotation in one direction of said at least one belt (or of said at least one chain) ensures movement of the gripping means, in particular of the hooking bar, from first position P1 to second position P2, in particular during loading operations; the reverse rotation ensures the movement of the hooking bar in the opposite direction, from second position P2 to first position P1, in particular during unloading.

According to one embodiment, the hooking bar connecting the two belts may be replaced by two hooking members, synchronized and independent, respectively secured to the two belts (or chains) and configured to be moved jointly along the first direction X.

According to one embodiment, said transport and storage assembly may comprise a robotic arm, in particular multi-axis, for example six or more axes, arranged at the level of track PST. The robotic arm comprises a gripper, typically pneumatic, said robotic arm being configured to transfer items supplied by the automated guided vehicles.

The robotic arm may be arranged in a fixed position on said track according to a first embodiment. The robotic arm may also be provided as movable on the track at least in a horizontal direction, or even in the first direction X and the second direction Y; for example, the robotic arm may be carried on board an automated guided vehicle configured to move in the first direction X and the second direction Y.

When preparing an order comprising the assembling of items contained in several cells, the robotic arm may be operated to gather (wholly or in part) the items collected by several automated guided vehicles, at the track level.

The order preparation process may comprise:

/A/obtaining an order containing at least one first item contained in a first receptacle, and at least one second item contained in a second receptacle, the first receptacle and second receptacle being stored in cells of the rack system, /B/moving a first automated guided vehicle on the track, to one of the circulation shafts, lowering the gripping means to be level with the cell containing the first receptacle, and controlling the lateral movement-enabled gripping means to load the first receptacle onto the base support, then raising the base support and the receptacle held by the gripping means, to above the track, /C/moving a second automated guided vehicle on the track, to one of the circulation shafts, lowering the gripping means to be level with the cell containing the second receptacle, and controlling the lateral deployment-enabled gripping means to load the second receptacle onto the base support, then raising the base support and the receptacle held by the gripping means, to above the track, /D/moving the first vehicle supporting the first receptacle and/or the second vehicle supporting the second receptacle to within the field of action of the robotic arm at the track level, and having the robotic arm assemble the order containing the first item and the second item.

Generally speaking, assembling the order may be carried out wholly or in part at the level of track PSR. The transport and storage assembly may comprise one or more order preparation stations.

The order preparation station(s) are typically provided on the floor on which the shelving units of the rack system rest: an order preparation station may typically comprise a user interface with a screen configured to display information about the order. Once the receptacles (and items contained in the receptacles) have been collected by the automated guided vehicles up at the track, the various receptacles (or an order assembled by the robotic arm) may be lowered.

According to one embodiment, because the shelving units of the rack system rest on the floor, said assembly may comprise at least one receptacle elevator ASC, said elevator being configured to raise the receptacles from the floor to the track for gripping by the automated guided vehicles, and/or at least one elevator configured to lower the receptacles unloaded by the vehicles, from the track to the floor.

According to another embodiment (not illustrated), the items (or the partially or fully assembled order) may be lowered from the track by one or more automated guided vehicles by actuating the base support, the receptacle being held while lowered; the storage system may typically comprise one or more circulation shafts, in particular dedicated(s) to the descent of items or of the order to floor level, in particular intended for the order preparation station.

LIST OF REFERENCE SYMBOLS

V. Automated guided vehicle,
1. Vehicle body,
2. Lifting device,
20. First segment,
21. Second segment,
22. Third segment,
23. Base support,
P1. First position (of the gripping means ensuring retraction of the receptacle on the base support),
P2. Second position (of the gripping means ensuring lateral deployment of the receptacle relative to the base support),
PM. Gripping means (lateral movement-enabled)
R1, R2. First and second sets of rolling means,
GD. Guiding means (base support),
LS. Flexible connections,
B. Receptacles,
SR. Rack system,
RY. Shelving units,
RY1, RY2, RY3. First, second and third shelving units,
M1, M2, M3, M4. Uprights,
ITA, ITB. Mechanical interfaces (e.g. brackets),
ALV. Cells (for rack storage),
ALV1, ALV2. First and second cell,
RV. Vertical rails,
EA. Lateral access openings (cells),
CHR. Circulation shafts,
CAP. Cover,
CAPm. Movable cover,
AL. Circulation aisle,
PST. Track,
Ra1. First rails (Track),
Ra2. Second rails (Track),
X. First direction,
Y. Second direction,
Z. Third direction,
ASC. Elevator,
PM. Gripping means (lateral movement-enabled).

The invention claimed is:

1. A rack system for the storage of receptacles, configured to be served by one or more automated guided vehicles, the or each vehicle being configured to collect receptacles of the rack system for the storage of said receptacles, said vehicle comprising:

a vehicle body equipped with rolling and driving means for the vehicle;

a loading and unloading device connected to the vehicle body and comprising:

a gripping device comprising at least a base support equipped with gripping means configured to grip or release a receptacle, a lifting system comprising means for raising and lowering the gripping device, configured to raise and lower the base support of the gripping device as well as the receptacle held by the gripping device, relative to said vehicle body, along a third direction which is vertical, said loading and unloading device comprising said gripping means which is lateral movement-enabled relative to the base support and is configured to transfer the gripped receptacle from the base support to the rack system, or conversely from the rack system to the base support, said rack system comprising:

shelving units comprising at least one shelving assembly comprising a first shelving unit and a second shelving unit which are arranged relative to each other in a first direction, the first shelving unit and the second shelving unit extending lengthwise in a second direction perpendicular to the first direction, the first shelving unit and the second shelving unit being spaced apart in the first direction, leaving between them a circulation aisle extending lengthwise in the second direction between the two shelving units, and wherein at least the first shelving unit and the second shelving unit each comprise one or a plurality of columns of cells, the cells of each column being superimposed vertically, said plurality of columns of cells being offset in the second direction, the cells having lateral access openings enabling loading of cells with receptacles from the circulation aisle or conversely unloading of receptacles contained in the cells into said circulation aisle, a track arranged on the rack system, above said shelving units, comprising first rails oriented in the first direction and configured for movement of the vehicle along said first direction, and second rails oriented in the second direction and configured for movement of the vehicle in the second direction, said track being configured to cooperate with the rolling and driving means of the automated guided vehicle to enable movement of the vehicle above the shelving units and above said circulation aisle along the first direction and along the second direction with the gripping device in a raised position, said track comprising one or more passages for the gripping device, aligned with one or more circulation shafts of the circulation aisle, the passage(s) being configured to allow a selective descent of the gripping device in said circulation shafts, a system of covers which close off the shelving units from above, comprising removable covers configured for removably closing said passage(s), and wherein the cells of the first shelving unit and/or of the second shelving unit have said lateral access openings allowing the cells to be loaded with receptacles from the circulation shafts of said circulation aisle, from a first position of the lateral movement-enabled gripping means in which the receptacle is retracted relative to the base support in said circulation shaft, to a second position in which the receptacle is moved into said cell.

2. The rack system according to claim 1, wherein the removable covers are configured to be removable by pivoting or by sliding.

3. The rack system according to claim 1, wherein the shelving units, including the first shelving unit and the second shelving unit, comprise vertical uprights interconnected by a bracing system, and a plurality of pairs of mechanical interfaces which are fixed to the uprights and distributed along a height of the rack to form said superimposed cells, each pair of mechanical interfaces comprising:

a first interface fixed to at least two uprights of the vertical structure, cantilevered relative to the two uprights and extending lengthwise in the first direction a second interface fixed to at least two other uprights of the vertical structure, cantilevered relative to the two other uprights and extending lengthwise in the first direction and wherein support portions of the first interface and of the second interface are oriented towards each other and cantilevered relative to the uprights, in the second direction, said support portions being configured to ensure support of a receptacle supported by the two support portions of the two interfaces on both sides of the receptacle.

4. A transport and storage assembly comprising a rack system according claim 1 and one or more automated guided vehicles comprising:

the vehicle body equipped with rolling and driving means for the vehicle, the loading and unloading device connected to the vehicle body and comprising:

the gripping device comprising at least a base support equipped with gripping means configured to grip or release a receptacle, the lifting system comprising the means for raising and lowering the gripping device, configured to raise and lower the base support of the gripping device as well as the receptacle held by the gripping device, relative to said vehicle body, along the third direction which is vertical, said loading and unloading device comprising said gripping means which is lateral movement-enabled relative to the base support and configured to transfer the gripped receptacle from the base support to the rack system, or conversely from the rack system to the base support, the vehicle(s) being configured for:

traveling on the track of the rack system in the first direction and in the second direction, above the shelving units and above said circulation aisle between the first shelving unit and the second shelving unit, lowering the base support and said gripping means, with the gripping means in the first position, through one of the passages of the track into one of the vertical circulation shafts which are part of said circulation aisle, until level with one of the cells of one of the shelving units, and proceeding to load said cell with a receptacle via lateral movement of the gripping means into the second position, by which the receptacle is deployed through the lateral access opening into said cell, or proceeding to unload a receptacle stored in said cell by retraction of the gripping means into the first position.

5. The transport and storage assembly according to claim 4, comprising a robotic arm arranged at the level of the track and comprising a gripper which typically is pneumatic, said robotic arm being configured to transfer items supplied by the automated guided vehicles, said robotic arm being arranged in a fixed position on said track, or provided as movable on the track in at least a horizontal direction, or even in the first direction and second direction.

6. An assembly including the transport and storage assembly according to claim 4, comprising receptacles configured to be loaded and unloaded into and out of the cells of the rack system by the lateral movement-enabled gripping means of the vehicles, and wherein some or all of the cells of the first shelving unit or second shelving unit are multiple cells of multiple depths, each multiple cell being configured to receive at least two receptacles arranged one behind the other in the first direction, and wherein the lateral movement-enabled gripping means is configured to load and unload said at least two receptacles into and out of said multiple cell.

7. The transport and storage assembly according to claim 6, wherein the shelving units of the rack system are resting on the floor, said assembly comprising at least one receptacle elevator configured to raise the receptacles from the floor to the track for pickup by automated guided vehicles, or configured to lower the receptacles unloaded by the vehicles, from the track to the floor.

8. The assembly according to claim 6, wherein the gripping device comprises the base support which is equipped with guide means configured to guide said base support along vertical rails of the storage rack system.

9. The assembly according to claim 6, wherein the lateral movement-enabled gripping means is provided with a lateral deployment mechanism comprising:

a telescopic arm connecting the gripping means and said base support, comprising at least a first segment and a second segment that is mounted to slide relative to the first segment in a horizontal sliding direction, an actuation means comprising a transmission connecting the first segment and the second segment, configured to deploy the telescopic arm from a retracted position of the first segment and the second segment in which said gripping means is retracted relative to the base support along the sliding direction, and to a deployed position of the first segment and the second segment in which the gripping means and the held receptacle are deployed laterally relative to the base support.

10. The assembly according to claim 9, wherein the telescopic arm is configured to be:

deployable from the retracted position to the deployed position which is a first deployed position, in a first deployment direction of the second segment relative to the first segment, deployable from the retracted position to a second deployed position, in a second deployment direction of the second segment relative to the first segment.

11. The assembly according to claim 9, wherein the transmission comprises a toothed belt and guide pulleys for the belt which comprise at least one motorized pulley.

12. The assembly according to claim 6, wherein the rolling and driving means comprise a first set of rolling means configured to ensure movement of the vehicle along the first direction in the rack system during use, and a second set of rolling means configured to ensure movement of the vehicle along the second direction in the rack system during use.

13. The assembly according to claim 12, having means for reversibly and selectively moving the first set of rolling means or the second set of rolling means away from an underlying vehicle support, during a change of direction between the first direction and the second direction.

14. The assembly according to claim 6, wherein the sliding direction of the telescopic arm is oriented along the first direction or oriented along the second direction.

15. The assembly according to claim 6, wherein the vehicle body includes a cavity arranged centrally inside the vehicle body, the cavity having at least one receptacle-receiving opening oriented towards the circulation shafts during use.

* * * * *